United States Patent
Chaney et al.

(10) Patent No.: US 7,207,240 B2
(45) Date of Patent: Apr. 24, 2007

(54) CONTROL CIRCUIT FOR REDUCING SPLITTER CYCLES IN AN AUXILIARY DRIVE BOX

(75) Inventors: Patrick Chaney, Greenville, SC (US); Ernest R. Thompson, Southern Pines, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 260 days.

(21) Appl. No.: 10/940,838

(22) Filed: Sep. 14, 2004

(65) Prior Publication Data

US 2006/0058153 A1    Mar. 16, 2006

(51) Int. Cl.
    *F16H 3/00*    (2006.01)
(52) U.S. Cl. .................... 74/745; 74/333; 74/810.2
(58) Field of Classification Search ................. 74/745, 74/810.1, 810.2, 331, 333
    See application file for complete search history.

(56) References Cited

U.S. PATENT DOCUMENTS

| | | | | |
|---|---|---|---|---|
| 4,788,889 A * | 12/1988 | Davis et al. | ................... | 74/745 |
| 5,511,437 A * | 4/1996 | Braun | ................... | 74/331 |
| 5,651,292 A * | 7/1997 | Genise | ................... | 74/745 |
| 6,128,974 A * | 10/2000 | Hughes | ................... | 74/745 |
| 6,185,494 B1 * | 2/2001 | Wadas | ................... | 701/51 |

* cited by examiner

*Primary Examiner*—Ha Ho
(74) *Attorney, Agent, or Firm*—Carlson, Gaskey & Olds

(57) ABSTRACT

A command assembly for controlling a splitter in a transmission allows shifting between first and reverse-low gears while the splitter is engaged without requiring the splitter to cycle during the shift. The command assembly creates a signal path for a split enable signal that keeps the transmission in the split mode as long as the transmission engages a low rail of a main drive box. By creating a separate signal path for the split enable signal when the transmission is operating in split mode, the splitter does not need to be cycled when the driver shifts between first and reverse-low gears.

14 Claims, 2 Drawing Sheets

CONTROL CIRCUIT FOR REDUCING SPLITTER CYCLES IN AN AUXILIARY DRIVE BOX

TECHNICAL FIELD

The invention relates to manual transmission controls, and more particularly to a control circuit that controls the operation of gears in an auxiliary drive box.

BACKGROUND OF THE INVENTION

Many vehicles with manual transmission have gears in a main drive box with synchronizers and/or splitters in an auxiliary drive box. As is known in the art, most driving is conducted using gears in the main drive box, with a higher gear range, a low gear range, and/or an extra-low mode determined by the state of the auxiliary drive box. The extra-low gear is used to drive in conditions requiring high torque or low speed. In all cases, shifting between forward and reverse directions is performed in the main drive box, even if the vehicle is operating with the extra-low gear in the auxiliary drive box.

To operate the extra-low range gear, the driver can engage a splitter, operating the transmission in a split mode. However, if the driver wishes to go from forward to reverse while operating in the extra-low range gear, the transmission will naturally disengage the splitter and shift from forward to reverse. The driver would then re-engage the splitter to resume driving in the extra-low gear. This splitter cycling tends to cause premature wear of the splitter because splitters are not designed to withstand constant use. Although it is possible to make splitters more robust, doing so would increase the cost of manual transmissions due to the additional durability testing that would be required for such a modification.

There is a desire for a system and method that prevents excessive cycling of the splitter during shifting without requiring modification of the splitter itself.

SUMMARY OF THE INVENTION

The present invention is directed to a transmission system having a splitter switch that allows shifting to occur between gears that can be operated in a split mode (e.g., first-low and reverse-low gears) without causing cycling of a splitter in an auxiliary drive box. The latching circuit receives a feedback signal via a switch in a main drive box of the transmission. The feedback signal allows shifting to occur between first and reverse-low gears without causing the splitter to cycle.

In one embodiment, the transmission system includes a splitter select switch that is closed when the driver chooses to operate in a split mode. Closing the splitter select switch creates a feedback path that maintains an uninterrupted, self-feeding split enable signal to a solenoid assembly that maintains the transmission in the split mode. By creating a separate signal path for the split enable signal when the transmission is operating in the split mode, the splitter does not disengage when the driver shifts between forward and reverse gears.

DETAILED DESCRIPTION OF THE EMBODIMENTS

Figure 1:
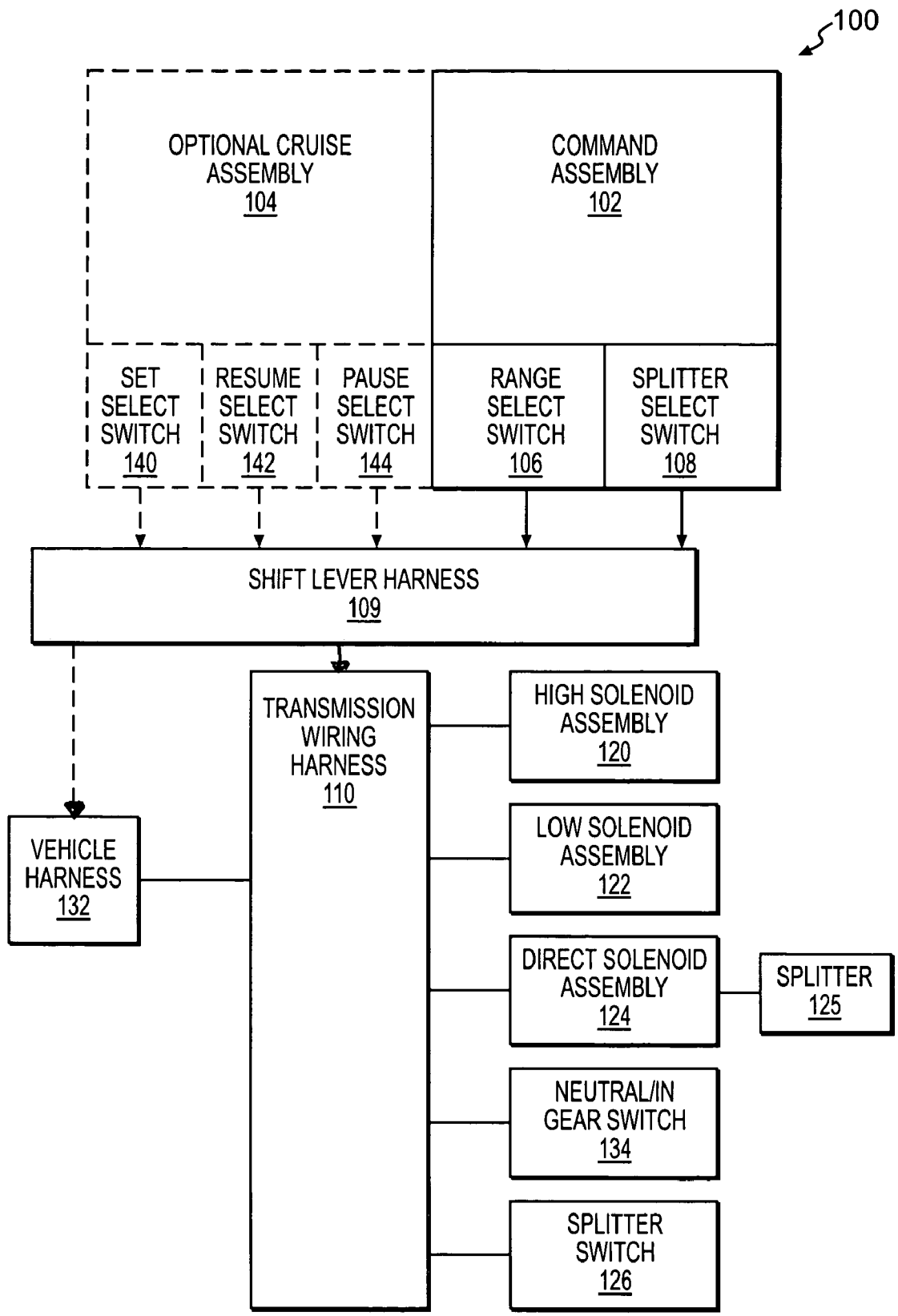
FIG. 1 is a block diagram illustrating components in a transmission system incorporating one embodiment of the present invention.

FIG. 1 is a block diagram illustrating a transmission system 100 incorporating one embodiment of the present invention. The transmission system 100 includes a command assembly 102 with user-operable switches, including a range select switch 106 and a splitter select switch 108. The range select switch 106 and the splitter select switch 108 allow a user to select operation modes for the transmission system 100. Operation of the switches in the command assembly 102 will be described in greater detail below with respect to FIG. 2. In one embodiment, the range select switch 106 switches the transmission system 100 between high and low gear ranges, and the splitter select switch 108 switches the transmission system 100 between direct and split modes. A shift lever harness 109 and a transmission wiring harness 110 act as interfaces between the command assembly 102 and other components in the transmission system 100 by receiving user-defined inputs from the range select switch 106 and the splitter select switch 108.

Control of the range select switch 106 switches the transmission system 100 operation between high and low range gears by connecting and disconnecting signal paths to a high solenoid assembly 120, which causes the synchronizer in the auxiliary drive box (not shown) in the transmission to shift to the high range, and a low solenoid assembly 122, which causes the transmission to shift to the low range. Switching the splitter select switch 108 energizes and de-energizes a direct solenoid assembly 124, which causes a splitter 125 located in the auxiliary drive box to operate in a direct mode or a split mode, respectively. The split mode is possible only when the transmission system 100 is in first or reverse-low gears and when the splitter select switch 108 is set to a "split" position. A splitter switch 126 closes when the transmission has engaged a low rail (not shown) in the main drive box. The low rail is engaged when the main drive box is in its lowest gear plane, which includes first gear, reverse-low gear, and other gears specific to the transmission model. The closed splitter switch 126 forms a signal path as long as a split condition exists in the transmission.

Other components in the transmission system 100 include an optional cruise assembly 104, a vehicle harness 132 for communicating with other vehicle systems, and a neutral/in gear indicator switch 134. The optional cruise assembly 104 includes a set select switch 140, a resume select switch 142, and a pause select switch 144 that are operable by the user in a currently known manner. Similar to the range select switch 106 and the splitter select switch 108 in the command assembly 102, the other components in the transmission system 100 receive user-defined inputs from the set select switch 140, the resume select switch 142, and the pause select switch 144 in the cruise assembly 104 via the shift lever harness 109.

Figure 2:
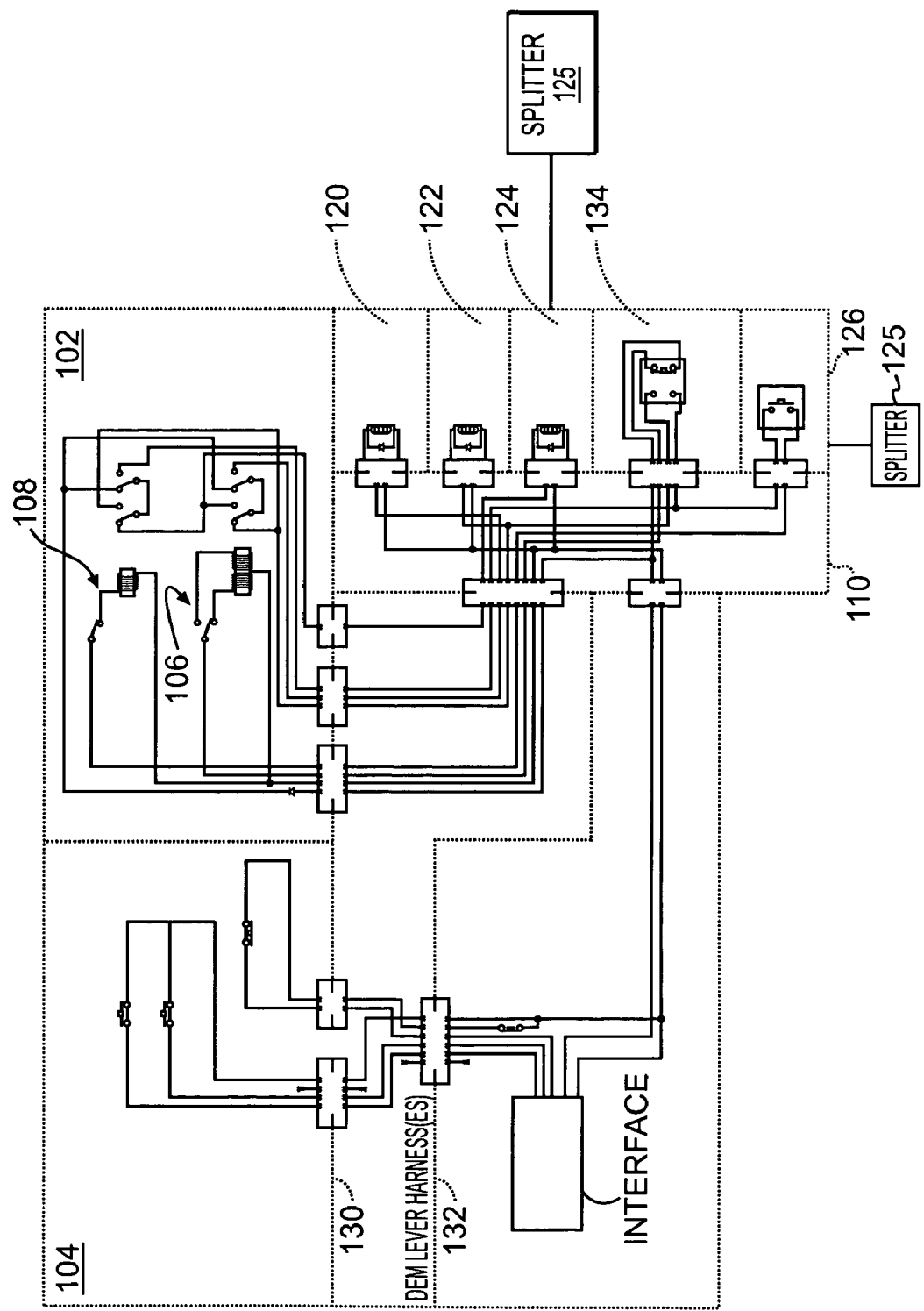
FIG. 2 is a schematic illustrating the system of FIG. 1 in greater detail.

As is known in the art, the transmission system 100 can operate in the split mode only when the low rail in the main drive box is engaged. Referring to FIG. 2, the range select switch 106 can be moved between high and low independently of the splitter select switch 108. More particularly, power only reaches the splitter select switch 108 to enable the split mode when the transmission main drive box has closed the splitter switch 126 by engaging the low rail. As can be seen in FIG. 2, moving the splitter select switch 108 to the direct mode position connects the low solenoid assembly 122, the high solenoid assembly 120, and the direct solenoid assembly 124 into the overall transmission system 100, allowing power to reach the direct solenoid assembly 124 and either the low solenoid assembly 122 or the high solenoid assembly 120. Also, when the splitter select switch 108 is in the direct mode position, the splitter switch 126 is open, causing the direct solenoid assembly 124 to switch to a direct mode (i.e., be energized), effectively disconnecting the splitter 125 from the transmission system 100.

If the splitter select switch 108 is moved to the split mode position and the transmission has engaged the low rail in the main drive box (i.e., first gear or reverse-low gear), the splitter switch 126 closes. The direct solenoid assembly 124 connects the splitter 125 into the transmission system 100. Typically, any deviation from these conditions (i.e., between first gear and reverse-low gear) discontinues the split mode of the transmission system 100 and the splitter 125 switches the transmission system 100 to the direct mode. The inventive system briefly prevents the splitter 125 from changing to the direct mode when the main drive box is still engaged with the low rail (i.e., between first gear and reverse-low gear). In one embodiment, the command assembly 102 may be designed to physically prevent the user to switch the range select switch 106 to the high gear mode to prevent accidental direct mode operation.

Shifting into first gear or reverse-low gear effectively closes the splitter switch 126, providing a dedicated signal path for a split enable signal to reach the command assembly 102. As shown in FIG. 2, the split enable signal travels from the command assembly 102 through the shift lever harness 109 and the transmission wiring harness 110 to the low solenoid assembly 122, causing the transmission to operate in low range. The split enable signal also travels to the splitter switch 126, through the signal path formed by the closed splitter switch 126 through the splitter 125, back to the command assembly 102, thus maintaining the split mode.

As long as the splitter select switch 108 remains in the split position and the main drive box engages the low rail, the closed splitter switch 126 ensures that the split enable signal remains uninterrupted, keeping the splitter 125 engaged even when the user switches between first and reverse-low gears. If the user switches between first and reverse-low in the split mode, the user can simply conduct the shift without having to first interrupt the split enable signal, which would disengage the splitter 125, before shifting.

Without the splitter switch 126 providing a continuous, constant signal path for the split enable signal in the split mode, the transmission system 100 would have to switch out of the split mode, switch between first and reverse-low, and then switch back to the split mode. In other words, the splitter switch 126 allows the transmission system 100 to stay in the split mode while shifting between first and reverse-low. As is known in the art, shifting between forward and reverse occurs in the main drive box. The split enable signal that is supplied when the splitter switch 126 is closed allows the main drive box to virtually ignore the state of the splitter in the auxiliary drive box when shifting. The transmission system 100 can shift between first and reverse-low without ever leaving the split mode.

By incorporating a splitter switch 126 in the transmission system 100, the invention allows switching between forward (first) and reverse (reverse-low) gears without disengaging and re-engaging the splitter 125 to conduct the shift. Instead, the splitter switch 126 ensures that there is an uninterrupted signal path for the split enable signal so that the splitter 125 can remain engaged as shifts occur between first and reverse-low during the split mode. As a result, the invention prevents excessive cycling of the splitter 125, reducing wear on the splitter without requiring potentially costly changes to the splitter 125 structure itself.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A control system for a transmission system shiftable between a forward gear and a reverse gear, the transmission having a splitter, the control system comprising:
   a splitter select switch that selects between a direct mode and a split mode; and
   a splitter switch that creates a dedicated signal path for a split enable signal that enables the splitter when the splitter select switch is in the split mode, said splitter switch being maintained closed, to maintain an uninterrupted engagement of the splitter when the transmission shifts between a forward gear, and a reverse gear.

2. The control system of claim 1, wherein the splitter select switch opens the splitter switch to disconnect the splitter from the transmission when the splitter select switch selects the direct mode.

3. The control system of claim 1, wherein the forward gear is a first gear and the reverse gear is a reverse-low gear, and wherein the splitter switch is kept closed to maintain uninterrupted engagement of the splitter when the transmission shifts between the first gear and the reverse-low gear when the splitter select switch selects the split mode.

4. The control system of claim 1, further comprising a range select switch that selects between a high range gear and a low range gear.

5. A transmission system shiftable between a first gear and a reverse-low gear, comprising:
   a high solenoid assembly corresponding to a high range gear;
   a low solenoid assembly corresponding to a low range gear;
   a range select switch that selects at least one of the high solenoid assembly and the low solenoid assembly to shift between the high range gear and the low range gear;
   a splitter; and
   a control system having
      a splitter select switch that selects between a direct mode and a split mode; and
      a splitter switch that creates a dedicated signal path for a split enable signal that enables the splitter when the splitter select switch is in the split mode to maintain uninterrupted engagement of the splitter when the transmission system shifts between the first gear and the reverse-low gear.

6. The transmission system of claim 5, wherein the splitter select switch opens the splitter switch to disconnect the splitter from the transmission system when the splitter select switch selects the direct mode.

7. The transmission system of claim 5, wherein the splitter switch remains closed to maintain uninterrupted engagement of the splitter when the transmission system shifts between the first gear and the reverse-low gear while the splitter select switch selects the split mode.

8. The transmission system of claim 5, further comprising a direct solenoid assembly in communication with the splitter select switch and the splitter, wherein the direct solenoid assembly is energized when the splitter select switch selects the direct mode to connect both the low solenoid assembly and the high solenoid assembly into the transmission system.

9. The transmission system of claim 5, wherein the range select switch and the splitter select switch are part of a command assembly, and wherein the transmission system further comprises at least one harness that acts as an interface for the command assembly.

10. The transmission system of claim 9, wherein said at least one harness comprises at least one of a shift lever and a transmission wiring harness.

11. The transmission system of claim 9, further comprising a vehicle harness that acts as an interface between the transmission system and another vehicle system.

12. The transmission system of claim 9, further comprising a cruise assembly having at least one of a set select switch, a resume select switch, and a pause select switch, wherein the cruise assembly communicates through said at least one harness.

13. A method for controlling a transmission that is shiftable between a first gear and a reverse-low gear and having a splitter, the method comprising:
    detecting selection of a split mode; and
    forming a dedicated signal path for a split enable signal that enables the splitter in response to selection of the split mode, wherein the dedicated signal path maintains uninterrupted engagement of the splitter when the transmission shifts between the first gear and the reverse-low gear while in the split mode.

14. The method of claim 13, further comprising interrupting the dedicated signal path in the direct mode.

* * * * *